INVENTORS
FREDERICK C. HOFFMAN
WILLIAM SCHROEDER
By George C. Sullivan
Agent

Jan. 3, 1961 F. C. HOFFMAN ET AL 2,966,873
DEVICE FOR FORMING SHEET MATERIAL
Filed Jan. 11, 1955 5 Sheets-Sheet 2

*INVENTORS*
FREDERICK C. HOFFMAN
WILLIAM SCHROEDER
By George C. Sullivan
Agent

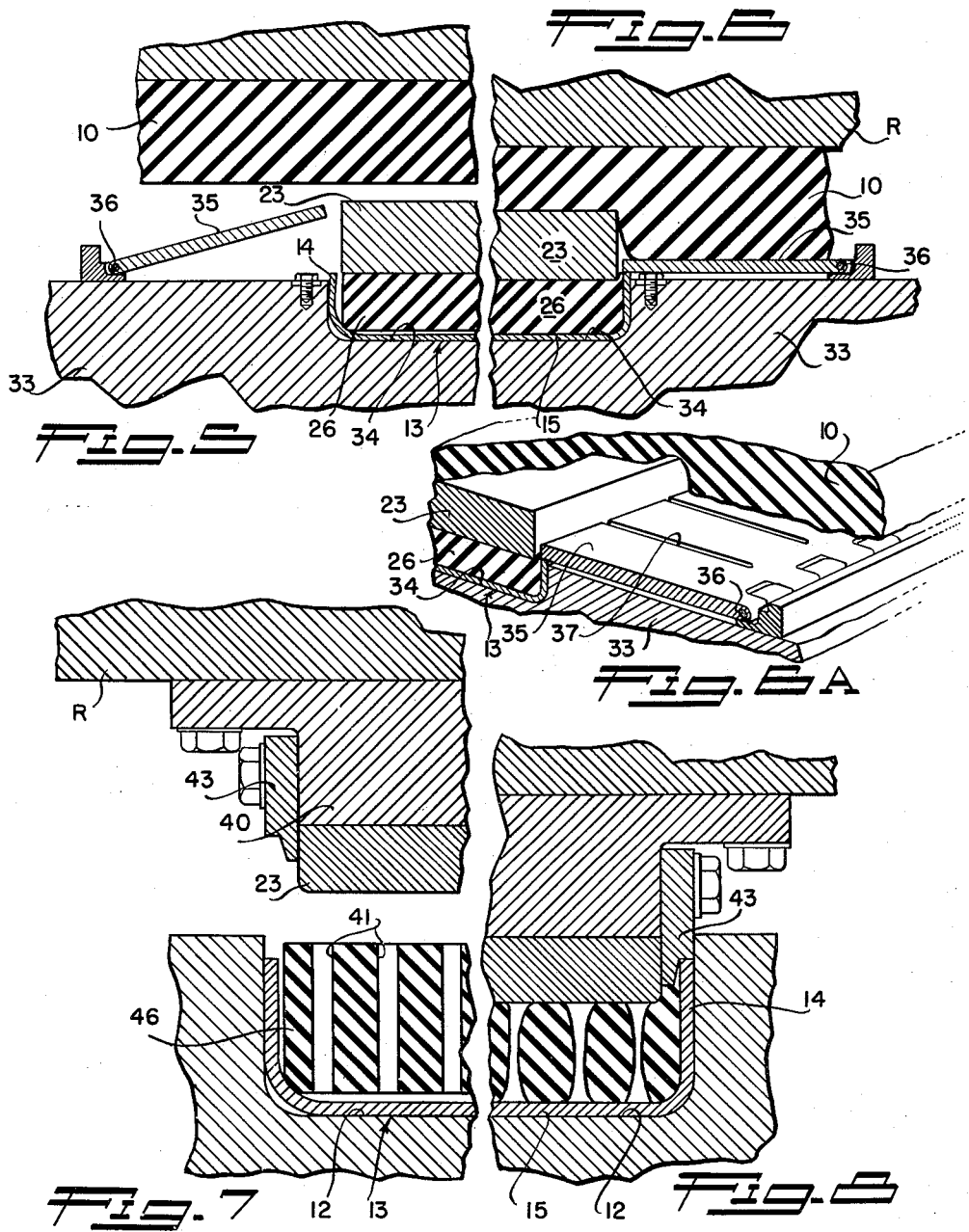

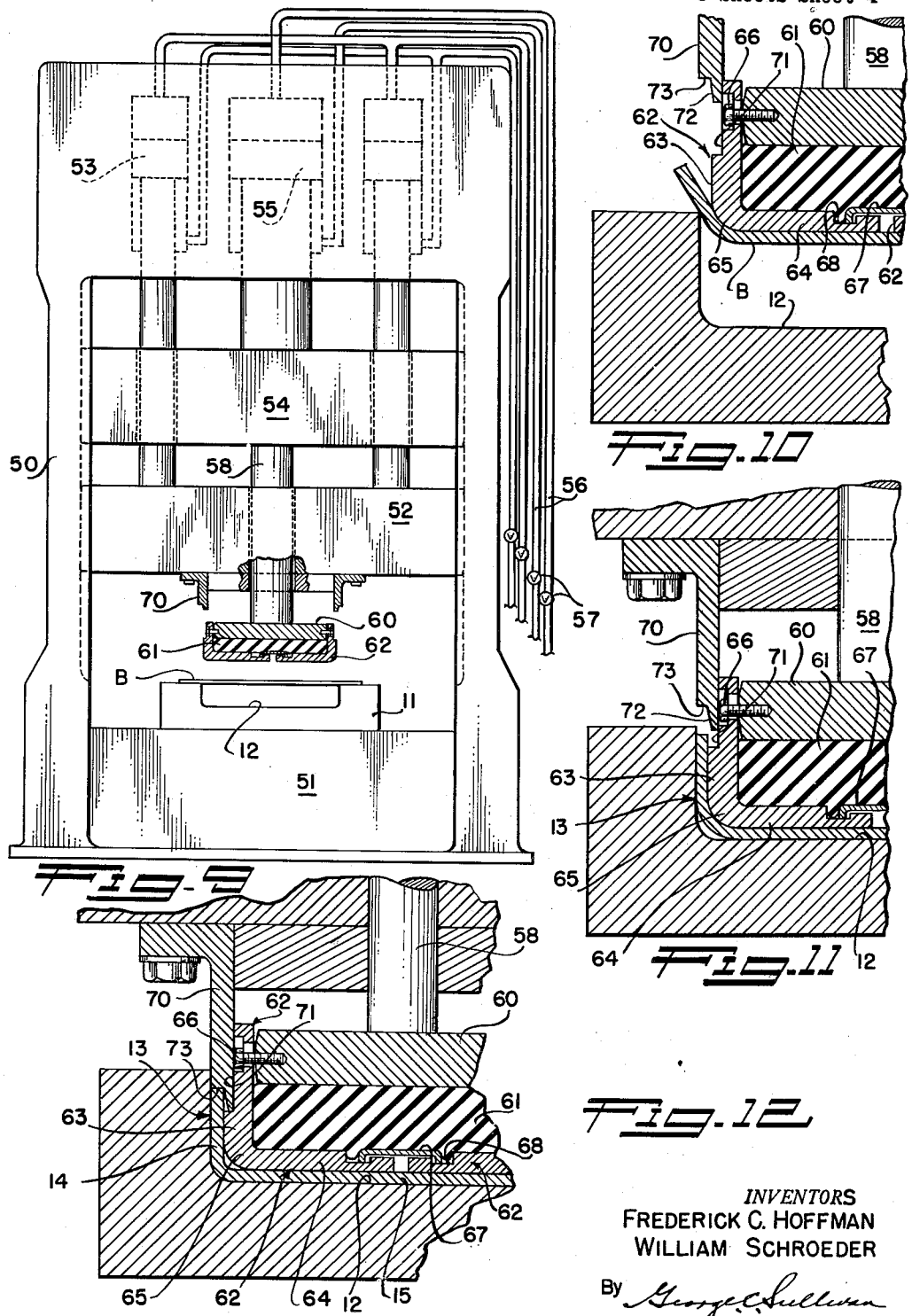

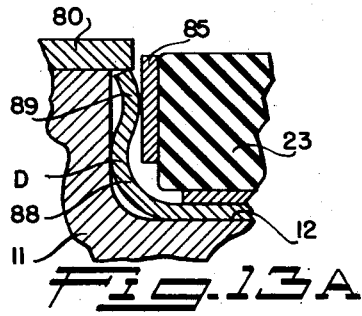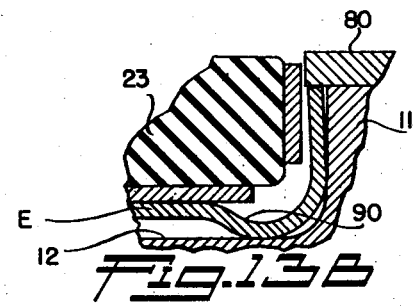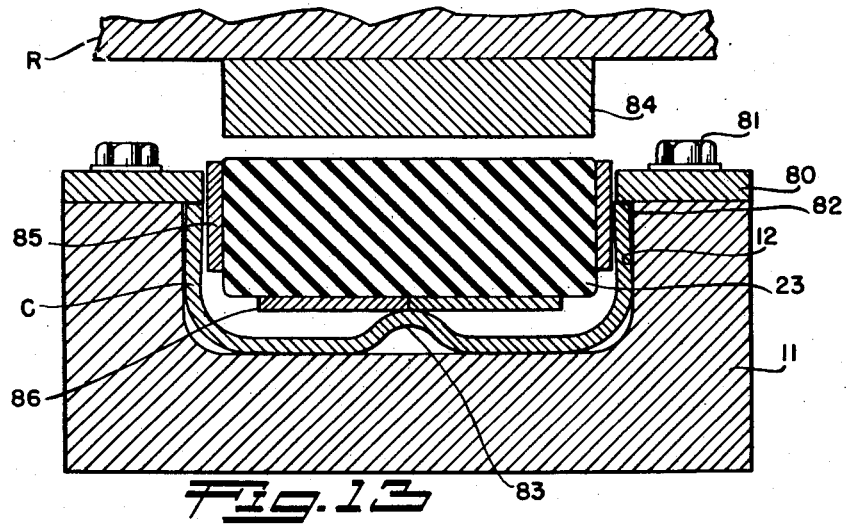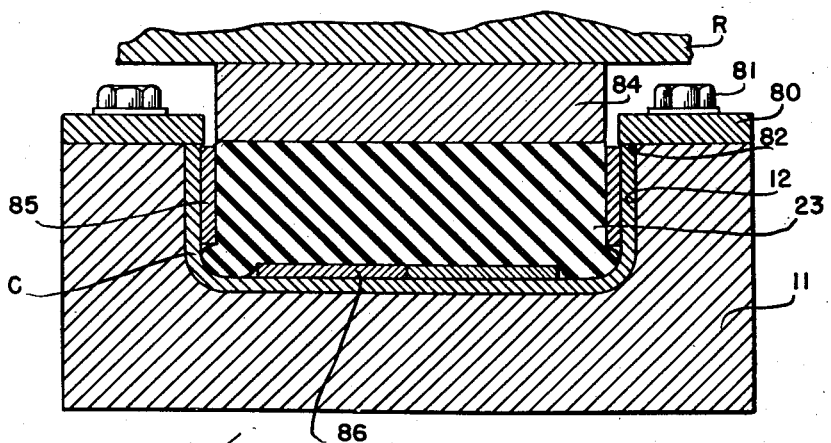

United States Patent Office 2,966,873
Patented Jan. 3, 1961

2,966,873

DEVICE FOR FORMING SHEET MATERIAL

Frederick C. Hoffman, Sherman Oaks, and William Schroeder, Sunland, Calif., assignors to Lockheed Aircraft Corporation, Burbank, Calif.

Filed Jan. 11, 1955, Ser. No. 481,202

8 Claims. (Cl. 113—44)

This invention relates to the forming of sheet metal and other sheet material and relates more particularly to the precision shaping and forming of channel-type parts of such materials and of other parts and components requiring close dimensional accuracy and having abrupt or relatively abrupt flange angles, and the like. It is a general object of this invention to provide a simple, practical and expeditious apparatus for obtaining extremely accurate dimensional tolerances in forming such parts and components.

In the manufacture of modern aircraft the dimensional accuracy of structural parts has become a highly important consideration and the older or conventional methods of forming flanges, etc. by bending operations on a hydropress block or a power brake, are no longer satisfactory. These conventional methods produce mold line and flange angle variations or inaccuracies too great for the assembly contour smoothness, etc. now required in the specifications for modern airplanes. The various bending techniques for accomplishing the desired accurate forming of parts have been studied, including "stretching" processes but were not found to provide an economical or practical solution. While it has been generally accepted that "stretching" techniques wherein all the fibers of the metal are yielded will, theoretically at least, minimize distortion to thereby obtain close tolerances, it is, so far as we are aware, a novel concept to yield the fibers of the sheet stock in compression rather than in "tension" in order to obtain the required dimensional accuracies of the parts. It is, therefore, an object of this invention to provide an apparatus for the precision forming of sheet metal channel-type components, and the like, wherein the fibers of the metal are compressed beyond the yield point so that the formed part closely and accurately retains the size and shape of the die in which it is formed or sized. In the compression forming procedure of the invention the elastic recovery of the outer and inner fibers of the sheet metal part is small and is substantially identical in the outer and inner fibers.

It is another object of the invention to provide an apparatus of the character referred to wherein minimum bend radii are obtained at the junctions of the flanges and web without injuring the metal. In employing the apparatus or equipment of the invention the radius at such a point or line may be equal to or substantially equal to the thickness of the sheet stock whereas with the conventional forming apparatus such radii has been at least twice the thickness of the material. The reduction in the radii at the flange angles is highly important since it allows the installation of fasteners, on the completed part, such as rivets, bolts, etc. at points much closer to the web of the channel, or the like, to thereby increase the strength of the assembly and thus permit a reduction in the weight of the assembly.

Another object of the invention is to provide an apparatus of the character mentioned in which the flange angles of the part can be held to very close tolerances, say, ±45 min. without resort to subsequent hand work and wherein the mold line width is also held to an accuracy of, say, ±0.010 inch without resorting to hand work.

A further object of the invention is to provide an apparatus of this kind wherein the longitudinal and lateral bowing of an elongate open ended channel part, or the like, are not excessive and are within acceptable limits.

A still further object of the invention is to provide an apparatus of this kind that can be utilized to either form and size a channel-shaped part, or the like, from an initially flat blank or to precision, size and shape a part that has been previously initially formed by conventional procedures to the approximate configuration and dimensions desired.

Other objectives and features of the invention will become apparent from the following detailed description of typical preferred forming apparatus of the invention wherein reference is made to the accompanying drawings in which:

Figure 5 is a fragmentary vertical sectional view of another form of apparatus of the invention embodying lever plates for applying endwise compression to the flanges of the part, showing the platen and punch assembly in the raised or unactuated position;

Figure 6 is a view similar to Figure 5 showing the parts in the actuated position;

Figure 6A is a fragmentary perspective view of the apparatus shown in Figures 5 and 6 with the parts appearing in vertical cross section and in the actuated positions;

Figure 7 is a fragmentary vertical view of a mechanical press type of apparatus of the invention with the platen and upper pad in the unactuated position;

Figure 8 is a view similar to Figure 7 showing the parts in the actuated position and the channel-part being precision formed and shaped to the die;

Figure 9 is a more or less schematic front elevation of a double action mechanical or hydraulic press with a form of apparatus of the invention applied thereto showing the rams and upper platens in the raised positions above the flat blank;

Figure 10 is a enlarged fragmentary vertical sectional view of the apparatus illustrated in Figure 9 showing the punch assembly acting upon the blank to draw the same into the die;

Figure 11 is a view similar to Figure 10 showing the punch or upper pad assembly bottomed against the part;

Figure 12 is a view similar to Figure 11 showing the compression blade acting upon a flange of the part;

Figure 13 is a fragmentary vertical sectional view of still another form of apparatus of the invention with the lower pad assembly arranged in place to act upon the work;

Figure 13A is a fragmentary vertical sectional view similar to Figure 13 illustrating a portion of the preformed workpiece of a different initial configuration;

Figure 13B is a view similar to Figure 13A illustrating still another configuration of the partially pre-formed workpiece; and Figure 14 is a view similar to Figure 13 showing the parts in the actuated positions.

Figure 1:
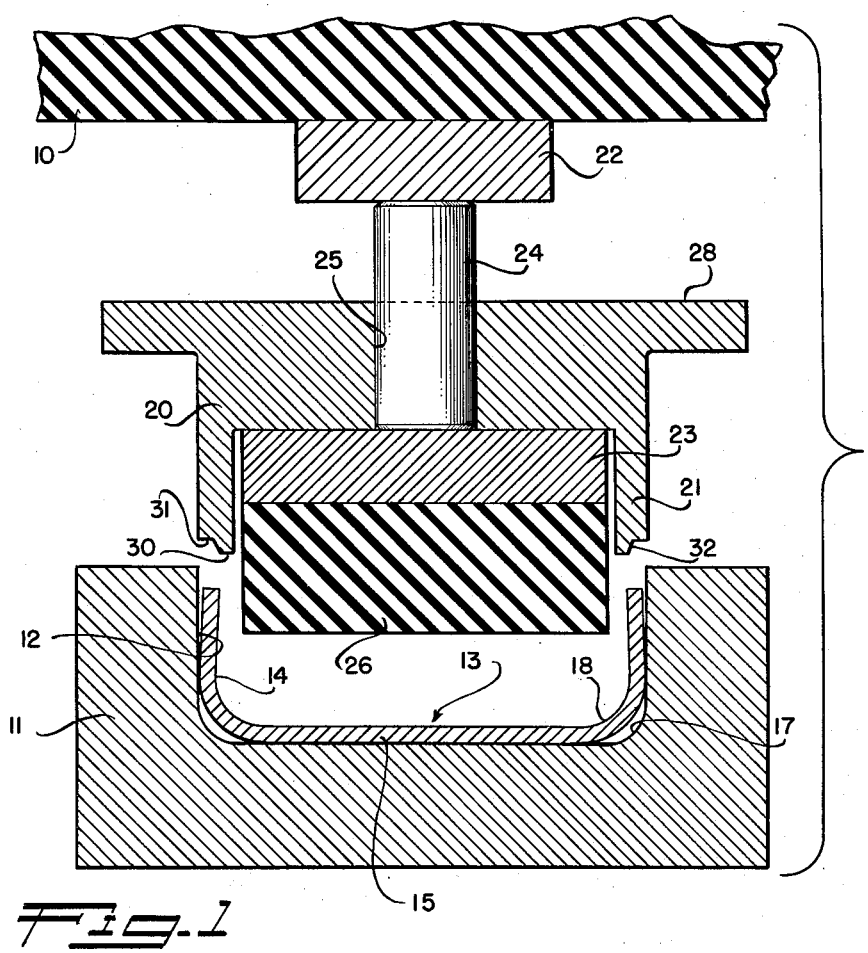
Figure 1 is a vertical sectional view of a single action hydropress form of die and punch means of the invention showing the punch assembly and pressure pad in the raised position and illustrating a pre-formed part arranged in the die.

The apparatus of the invention may be used on presses, and like machines of different kinds, and, of course, may be employed to form and to accurately size and shape parts of various dimensions and configurations. In the following description we will refer to several typical forms and applications illustrated in the drawings, it being understood that we do not wish to be limited to the specific details illustrated or described.

Figure 3:
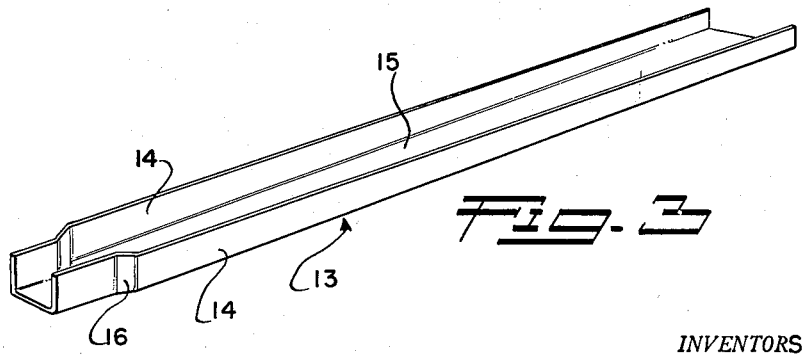
Figure 3 is a reduced perspective view of a channel-type part such as formed and/or precision sized and shaped by the method of the invention illustrating a joggle in the part.
Figure 2:
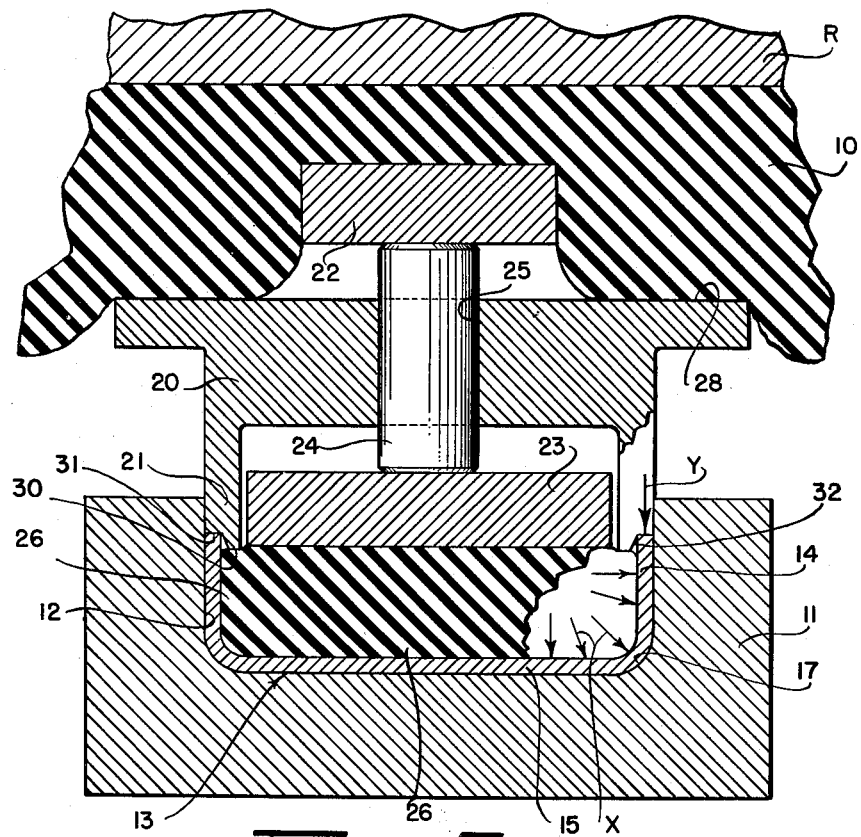
Figure 2 is a view similar to Figure 1 showing the punch assembly in the actuated position with arrows indicating diagrammatically the forces exerted on the part by the action of the apparatus.
Figure 4:
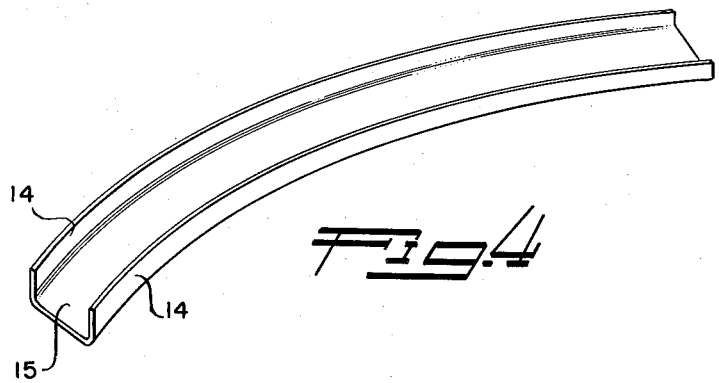
Figure 4 is a perspective view of another channel-like part capable of being either formed or accurately sized and finally shaped by the apparatus and method of the invention, this part having a longitudinal curvature.

In Figures 1 and 2, we have shown one manner of employing the invention in connection with a single action hydropress having a ram R for actuating a platen 10 of yielding resilient material such as rubber, synthetic rubber, or the like. A female die 11 is arranged or mounted below the ram R and platen 10 and has a cavity 12 in which the workpiece 13 is to be precision sized and shaped. It will be assumed the workpiece 13 has been initially preformed in any appropriate or conventional manner to the approximate final shape and dimensions. The workpiece 13 is an elongate open-ended channel-shaped part such as shown in Figure 3, having two spaced side flanges 14 and a web 15 extending therebetween. While the workpiece may be of practically any required proportion, the workpiece 13 illustrated may be considered to be an elongate channel in which the flanges 14 lie in planes at substantially right angles to the web 15, the latter being flat and elongate. In the particular instance illustrated the flanges 14 of the workpiece are joggled or offset inwardly adjacent one end at 16 thus providing the workpiece with an end portion of reduced width.

It may be assumed that the die cavity 12 is shaped and proportioned to give the workpiece 13, just described, its final accurate configuration and dimensions. The pre-formed workpiece 13 is adapted to be placed in the die cavity 12 to have its web 15 rest on the bottom wall thereof, as shown in Figure 1, and to have its flange 14 lie against or adjacent the side walls of the cavity. In this connection it will be observed that the side walls of the die cavity 12 extend upwardly or outwardly beyond the outer margins of the workpiece flanges 14 and these side walls join the inner or bottom wall of the cavity at radii or corners 17 that have a smaller arc or radius of curvature than the corresponding bend angles or corners 18 of the workpiece 13 as initially preformed.

The apparatus of Figures 1 and 2 further includes a punch assembly 20 to be actuated by the platen 10. The punch assembly 20 has elongate blades 21, to be later described in more detail, which are adapted to move downwardly into the die cavity 12 to act on the upper margins of the flanges 14 of the workpiece. A pressure pad 22 of metal, or the like, is arranged above the punch assembly 20 to be acted upon or forced downwardly by the yielding flowable platen 10. The under side of the punch assembly is relieved or recessed to house with clearance a second pressure pad 23 and one or more pins 24 transmit downward force and movement from the upper pad 22 to the lower pad 23. Where the workpiece is elongate the pads 22 and 23 are likewise elongate and it is preferred to employ a plurality of spaced pins 24, the pins being slidably guided in vertical openings 25 in the punch assembly 20. The lower pressure pad 23 is formed of metal or other hard or relatively hard material and is proportioned to be received between the above mentioned blades 21 with suitable working clearance.

The apparatus further includes a yielding, flowable pressure transmitting element 26 arranged below the lower pressure pad 23; that is arranged to enter the channel-like workpiece 13 and thus be confined by the internal surfaces of the flanges 14 and web 15 of the workpiece and by the inner or lower surface of the pad 23. This flowable, conformable force transmitting element 26 may be in the nature of a body or strip of rubber, synthetic rubber, cellular resilient plastic, cellular or foraminous rubber or rubber composition or a fluid containing bladder or bag of flexible material or of any other construction or material that permits it to exert an equal "hydraulic-like" pressure against the inner surfaces of the flanges 14 and web 15 when a downward force or pressure is applied to its upper surface by the pressure pad 23. It is a feature of the invention that this element 26, which I have shown constructed of rubber, or the like, is arranged and proportioned and the pressure pads 22 and 23 are related and proportioned so that upon the downward stroke or movement of the ram R the element 26 exerts a considerable force or pressure against the inner surfaces of the flanges 14 and web 15 before the blades 21, acting on the margins of the flanges 13, exert a sufficient compressive force to bring the fibers of the workpiece to the yield point. In fact, the pressures exerted against the flanges 14 and the web 15 by the element 26, which I will term restraining pressures or forces, are sufficient to prevent the workpiece 13 from buckling or distorting under the heavy compression loads or forces transmitted thereto by the blades 21 acting against the flanges 14. I have found it is often practical and desirable to proportion the pressure pads 22 and 23 so that the area of the lower pad 23 engaging the element 26 is approximately twice the area of the upper side of the upper pad 22 acted upon by the yielding platen 10.

Another feature of significance is the sequence of the pressures or forces applied to the workpiece 13. In accordance with the invention the element 26 is compressed or tightly pressed into the workpiece 13 to exert the restraining forces against the inner surfaces thereof prior to the application of the heavy compressive forces to the margins of the flanges 14 by the blades 21. In this connection it should be observed that these restraining forces which are represented in part by the arrows X in Figure 2, are applied substantially uniformly or equally throughout the entire internal surface of the workpiece 13 by the flowable element 26 thereby pressing all portions of the workpiece into tight or firm conformance with the walls of the die cavity 12. The pressure pads 22 and 23 and the pins 24 extending therebetween, are related and proportioned to first cause the flowable element 26 to be tightly pressed into the workpiece 13 upon downward movement of the ram R. As the head or ram R moves downwardly to effect this action the resilient flowable material platen 10 distorts and flows about the upper pad 22 to come into pressure contact with the upper face of the punch assembly 20. It will be observed that the punch assembly 20 presents a broad upper surface 28 engageable by the downwardly moving and flowable platen 10, the area of this surface engaged by the platen 10 being considerably larger than the area of the upper pressure pad 22 effectively acted upon by the platen 10. The platen 10, pressing downwardly against the broad upper face 28 of the punch assembly 20, insures the application or transmission of substantial or heavy downward forces to the punch. Thus the blades 21 of the punch assembly 20 are moved downwardly against the upper margins of the workpiece flanges 14 under heavy pressure represented schematically in Figure 2 by the arrow Y. The area of the punch surface 28 acted upon by the platen 10 is sufficiently large to insure the application of compression forces Y to the flanges 14 of such magnitude to overcome the frictional resistance resulting from the restraining forces X on the work part 13 and also to produce compression of the metal fibers of the workpiece beyond the elastic limit thereof. Thus, in addition to the automatic sequencing of the forces X and Y, applied respectively to the internal surfaces of the workpiece 13 and the margins of the flanges 14, these forces are related in magnitude to insure proper restraining of the flanges 14 and, in some instances, of the web 15 while the fibers of the flanges and adjacent regions of the web 15 are being subjected to compressive loads exceeding the elastic limit of the fibers thereof.

As shown in Figure 1, the die cavity 12 is sufficiently deep to have its side walls extend upwardly beyond the upper margins of the flanges 14 of the workpiece and the lower edges of the blades 21 are constructed to guide the flanges into effective or full cooperation with the blades. The lower edges of the blades 21 are stepped to have lower faces 30 at their inner sides and upper faces 31 at their outer sides, the two surfaces of each blade being joined or connected by upwardly and outwardly sloping guide surfaces 32. As illustrated in Figure 1, the flanges 14 of the preformed workpiece 13, as initially arranged in the die 11, may usually slope upwardly and away from the side walls of the die cavity 12. Upon downward movement of the punch assembly 20 the guide surfaces 32 of the blades 21 cooperate with the upper edges or corners of the flanges 14 to deflect or move the flanges outwardly toward the walls of the die cavity 12 and thus bring the upper margins of the flanges to positions where they are flatly and evenly engaged by the blade surfaces 31 for the transmission of the above described compressive forces to the flanges.

The die 11, the punch assembly 20, and related parts may, of course, be constructed to act upon and precision shape and size a workpiece such as shown in Figure 3, having the joggle or offset 16, may be constructed to precision shape and size a longitudinally curved workpiece such as shown in Figure 14 and to act upon elongate parts of other proportions and shapes. Furthermore, the equipment of the invention shown in Figures 1 and 2 and the method may be used in connection with hydraulic and mechanical presses of various types, drop hammers and other suitable machines.

It is believed that the method of the invention as employed in connection with the die equipment of Figures 1 and 2 will be readily understood from the foregoing detailed description. When the hammer, a head, or ram R, descends, the flowable element 26 is first forced downwardly into the workpiece 13 and the pad 23 applies downward force on the element so that the element in turn transmits the forces X against the workpiece to hold the web 15 and the flanges 14 downwardly and outwardly against the walls of the die cavity. With the workpiece 13 thus securely restrained in the die 11 the blades 21 descend against the upper margins of the flanges 14, the platen 10 serving to transmit substantial downward forces to the punch assembly so that heavy compressive loads are imposed on the flanges 14. These heavy compressive loads Y on the flanges 14 cause the fibers in the flanges and in the radius regions 18 of the workpiece to compress beyond their yield point thus minimizing subsequent spring-back and distortion. As the workpiece is being securely restrained against buckling by the forces X applied by the element 26 the compression formed workpiece is made to closely and accurately conform with the walls of the die cavity 12. We have found that the compression forming of the workpiece by this method accurately controls the outside dimensions of the workpiece. It may be employed to obtain an inside bend radius at the regions 18 as small as one times the thickness of the metal of the workpiece when forming aluminum alloys and under other circumstances where such a bend radius of two or more times the thickness of the metal is the smallest radius obtainable with the conventional methods and apparatus. Our method also retains the accuracy of the flange angles of the workpiece to within ±45 min. and the compression of the metal of the workpiece beyond the elastic limit holds the mold line width to ±0.01 inch without any subsequent hand work. The great accuracy obtained, the minimum radii and the small uniform mold line are believed to be obtained by reason of placing all fibers of the flanges 14 and of the mold line regions of the workpiece under compression. In the previous methods with which we are familiar, the outer fibers of the workpiece at the regions 18 are under tension whereas the fibers inwardly of the neutral axis, that is the inner fibers, are under compression. In our method all fibers, that is both the inner fibers and the outer fibers, of these regions are compressed to or beyond the yield point, thus permitting the obtaining of minimum radii and accurate radii with little or no danger of fracturing or otherwise damaging the metal. It will be seen that the forces X applied and maintained by the flowable element 26 restraining the workpiece against inward buckling displacement or distortion makes it possible to apply the compression forming loads and obtain the results above described.

The apparatus of Figures 5, 6 and 6A includes a die 33 having a cavity 34 for receiving a preformed workpiece 13. In this arrangement the cavity 34 is proportioned so that the margins of the flanges 14 protrude beyond the upper face of the die when the workpiece is first placed in the die. The flowable element 26 is placed in or is adapted to enter the channel-like workpiece and has its upper surface adjacent the tops of the flanges 14. The pressure pad 23 engages downwardly against the top of the element 26 and the flowable material platen 10 in turn engages or moves downwardly against the top of the pad 23. In this form of the invention there are plates 35 engaged or acted upon by the platen 10 to apply the compression forming forces to the upper margins of the flanges 14. These hinged plates act as a punch assembly in a manner similar to assembly 20 of Figures 1 and 2. These plates 35 may be hinged on the die 33 at 36. When the platen 10 flows or deforms downwardly around pad 23 after the application of the restraining forces or loads to the workpiece 13, the plates are engaged and moved downwardly by the platen to press against the upper edges of the flanges 14. As illustrated in Figure 6A, the plates 35 may have longitudinally spaced slots 37 extending from their active edges to make the plates flexible so as to conform with any irregularities there may be in the upper margins of the workpiece flanges 14. The plates 35 present broad or extensive upper surfaces engageable by the platen 10 so as to transmit sufficiently heavy downward pressures to the flanges 14 of the workpiece to place all fibers of the flanges 14 and adjacent regions of the web 15 under compression beyond the yield point. It will be observed that in the operation of the equipment illustrated in Figures 5, 6 and 6A the platen 10, upon downward travel of the hammer, head, or ram R, first transmits downward force to the pad 23 which, in turn, causes the flowable element 26 to exert or transmit uniformly distributed restraining forces against the internal surfaces of the workpiece and the platen 10 subsequently flows downwardly around the pad 23 to actuate the movable plates 35 against the margins of the flanges 14 to transmit thereto the heavy compression loads.

Figures 7 and 8 illustrate another embodiment of the invention useful on mechanical presses, hammers, and the like. In this case the die 11 may be substantially the same as in Figures 1 and 2 and the flanges 14 of the workpiece 13 (as initially placed in the die cavity 12) have their upper margins spaced below the top surface of the die. The element 46, corresponding in function to the element 26 above described, may be a fluid pressure bag, a spring arrangement or a body of rubber, synthetic rubber, or the like, having a plurality of vertically spaced openings 41 to permit substantial flow and distortion of the material. When initially placed in the work-piece 13 the element 46 preferably protrudes upwardly beyond the upper margins of the flanges 14 but may still be within the confines of the die cavity 12. The punch assembly is secured to the underside of the head, or ram R, and carries a pressure pad 23 for pressing downwardly against the element 46. The punch assembly further includes blades 43 at the sides of the pad 23 for acting on the margins of the workpiece flanges 14. The lower edges of the blades 43 may be the same as those of the blades 21 to obtain full effective cooperation with the upper edges of the flanges 14. The pressure pad 23 protrudes downwardly beyond the blades 43 to act on and apply downward pressure to the element 46 before the blades 43 engage the flanges. Thus the element 46 is caused to apply restraining forces to the internal surfaces of the workpiece 13 before the blades 43 engage the flanges 14, these restraining forces being maintained and increased as the ram R continues to move downwardly to bring the blades 43 against the flanges 14. The blades 43 exert downward pressure on the flanges 14 to put all fibers of the flanges and adjacent regions of the web 15 under compression beyond the yield point to precisely form and size the work part in conformance with the die cavity 12, the action of this apparatus being substantially the same as that of Figures 1 and 2.

Figures 9 to 12 inclusive, illustrate the invention applied to a double action press to form a blank B into an accurately dimensioned channel-like part. The press shown diagrammatically includes a frame 50 having a bed 51 which carries the die 11. A main ram 52 is movable vertically in the frame 50 by pistons 53 and a "clamping ram" 54 is movable above the ram 52 by a piston 55. The pistons 53 and 55 are actuated and controlled by fluid pressure supplied by lines 56 having control or regulating valves 57, all as conventional in such presses. The clamping ram 54 has a plunger 58 freely passing downwardly through the main ram 52 and a punch assembly is secured on the lower end of the plunger. The punch assembly includes a pressure pad 60 secured on the lower end of the plunger 58 and a flowable material element 61 corresponding in function to the element 26 arranged on the lower side of the pad. The assembly further includes wipers 62 enveloping or partially enveloping the flowable or compressible element 61 to cooperate with the blank B. These wipers 62 are angle shaped parts having vertical flanges 63 covering the sides of the element 61 and bases 64 at the lower sides of the element 61, the flanges and bases being joined at rounded corners 65. The flanges 63 are connected with the pressure plate or pad 60 by lost motion slot and screw connections 66 which allow relative vertical movement between the wipers and the pad. The bases 64 of the wipers are linked together for relative horizontal movement by means which prevents extrusion of the element 61 between the bases. The link means shown includes a channel-shape elongate link 67 engaged in grooves 68 in the upper sides of the bases 64, connecting the wipers one with the other for relative horizontal movement while preventing extrusion of the element 61 between the adjacent opposing edges of the bases 64. The loose linking together of the wipers 62 allows the flowable material element 61 to force and hold the wipers laterally against the side walls of the die cavity as well as downwardly against the bottom wall of the cavity to impose restraining pressures on the part or blank B during the precision shaping and sizing of the blank.

The apparatus of Figures 9 to 12 inclusive further includes blades 70 bolted or otherwise secured to the main ram 52 and extending downwardly at the sides of the pad 60 and wipers 62. The upper outer corners of the wiper flanges 63 have recesses or grooves 71 adapted to freely receive the lower portions of the blades 70 and the lower ends or edges of the blades are stepped in the manner of the above described blades 21 to have guide surfaces 32 for cooperation with the upper inner corners of the workpiece flanges and shoulders 73 for engaging downwardly against the upper edges of the flanges.

In the operation of the equipment illustrated in Figures 9 to 12 inclusive, that is in practicing the method of the invention therewith, the elongate blank B is placed on the upper surface of the die 11 and the ram 54 is actuated to move the punch assembly downwardly, bringing the wipers 62 against the blank B to wipe or form the blank into the die cavity 12. Figure 11 shows the blank B being drawn into the die cavity 12 during this operation. When the blank B has bottomed in the die cavity 12 additional pressure may be exerted by the piston 55 whereby the element 61 exerts downward and lateral restraining forces on the shoes or wipers 62. This, in turn, presses the main web and flanges on the blank downwardly and laterally against the walls of the die cavity bringing the blank to a condition such as shown in Figure 11. With these restraining forces maintained on the blank the pistons 53 are actuated to move the main ram 52 downwardly, bringing the blades 70 into contact with the upper margins of the workpiece flanges to impose the compression forming forces on the workpiece. As in the other embodiments of the invention the blades 70 apply sufficient pressure edgewise on the flanges of the blank to put all fibers of the flanges and adjacent portions of the workpiece under compression beyond the yield point, this action taking place while the above described restraining pressures are maintained by the wipers 62. As in the other embodiments of the invention these concerted actions precisely form the blank or workpiece to the die cavity 12 and produce small radii corners without in any way damaging the metal.

In the above described several embodiments of the invention, compression forces were applied to the margins of the workpiece flanges to produce a vertical or edgewise compression and flow of metal in effecting the precision sizing and shaping of the part. In the arrangements illustrated in Figures 13 to 13B inclusive, the edgewise compression and flow of the metal is attained without the use of blades for acting on the edges of the workpiece flanges. In these embodiments of the invention the die 11 is provided at its upper side with plates 80, protruding inwardly at the side walls of the die cavity 12. The plates 80 may be secured to the die 11 by bolts or screws 81 and overhang the sides of the die cavity 12 to present downwardly facing shoulders 82 at the mouth of the cavity. In the application of the invention illustrated in Figures 13 and 14, the workpiece C, initially preformed, is substantially channel-shape to be readily entered in the die cavity 12 and its main web has one or more upstanding ridges or corrugations 83 provided therein. The head or ram R of the press, or the like, is provided at its underside with a punch or pressure pad 84 engageable with the upper side of a flowable material element 23, substantially the same as the element 23 described above. Downward pressure exerted on the element 23 by the pad 84 causes the element 23 to exert restraining pressure on the internal surfaces of the internal workpiece C. It is desirable to provide plates or shoes 85 on the sides of the element 23 to prevent the material of the element from extruding against the stop plates 80, etc. It is also desirable to provide plates 86 at the underside of the element 23 to cooperate with the raised ridge 83 in order to apply the compressive forming and sizing forces to the workpiece. While a single flexible plate may be provided at the underside of the element 23 we prefer to arrange two plates with their edges in initial abutment at the crest at the ridge 83.

In employing the apparatus of Figures 13 and 14 the workpiece C is first placed in the die cavity 12 either by sliding it into the cavity from one end or by removing the plates 80 to permit vertical entrance of the preformed workpiece. The plates 80 are, of course, replaced to overhang the mouth of the cavity 12 and thus provide the shoulders 82 mentioned above. The element 23 with its plates 85 and 86 are positioned in the workpiece whereupon the ram R is actuated to move the pad 84 downwardly against the element. During the initial portion of this action the material of the element 23 is caused to flow and exert lateral pressures on the flanges of the workpiece C to positively restrain them against the walls of the cavity 12. Continued downward movement of the ram R causes the plates 86 to be pressed against the ridge 83 with sufficient force to flatten the ridge, thus displacing or "compressing" the material of the workpiece C laterally in both directions. This, in turn, brings the upper margins of the workpiece flanges into pressure engagement with the shoulders 82 and as the flattening of the ridge 83 progresses the material of the workpiece is put under compression throughout so that the inner and outer fibers of the workpiece are compressed beyond the yield point thus accurately forming and sizing the workpiece to the die cavity 12.

Figure 13A illustrates a workpiece D wherein the flanges 88, or at least one flange thereof, has one or more ridges 89 provided therein when the workpiece is preformed before introduction into the die cavity 12. In this case the final heavy ram pressure exerted on the element 23 by the pressure pad 84 forces the plate 85, or both plates 85, against the ridge or ridges 89 to flatten the same and thus put the material of the workpiece D under compression throughout to accurately size and shape the workpiece to the die cavity. Figure 13B illustrates still another form of workpiece E that may be used with the apparatus of Figures 13 and 14. In this case the main web of the workpiece E as preformed, is bent or curved upwardly adjacent each edge as at 90 to be spaced above the bottom wall of the die cavity 12. When the final heavy ram pressures are exerted through the medium of the element 23, these curved or bent regions 90 are caused to straighten out and the metal of the workpiece E is made to flow so as to put the entire workpiece under compression. This action, as in the other embodiments of the invention, precisely sizes and forms the workpiece to the die cavity 12.

From the foregoing it will be seen that I have provided simple, practical and expeditious methods and apparatus for accurately or precisely forming and sizing channel-shaped parts of sheet metal, and the like, to have very accurate mold lines, closely dimensioned external surfaces, and small corner radii. In a typical production operation a blank may be preformed or preshaped in a hydro block press, or the like, then heat treated to remove the stresses and then finally compression formed while in the W condition with the apparatus of Figures 1 to 8 inclusive or 13 to 14 inclusive. In other cases the flat blank B may be both preformed and finally precisely formed and shaped with the apparatus of the invention as shown in Figures 9 to 12 inclusive. The parts compression formed in accordance with the invention have substantially uniform elastic recovery throughout and therefore have little or no distortion due to spring-back. The extremely small bend radii attained may make it practical to construct the channel parts of a lighter gauge material and, as above pointed out, facilitates lighter, more accurate precision assembly.

Having described only typical forms of the invention we do not wish to be limited to the specific details herein set forth, but wish to reserve to ourselves any variations or modifications that may appear to those skilled in the art and fall within the scope of the following claims.

We claim:

1. Means for accurately sizing and shaping an elongate channel shaped piece having a center web and flanges joining the same at corners comprising a die having a cavity in which the piece is arranged, a flowable-material element engaged in the channel shaped piece, punch means including pressure means for pressing against said element, and parts movable relative to the element and the pressure means toward the web for pressing against the margins of said flanges, said pressure means normally extending above said parts when the lower end of said pressure means is in contact with said element and the lower end of said parts are in contact with said flange and platen means operable to first apply pressure to said pressure means to forceably press the element in the piece and thereby hold the web and flanges firmly against the walls of the cavity and then operable to apply pressure to said parts to compress the material of the piece beyond the yield point while the web and flanges are thus held against said cavity walls, said platen means including a platen of flowable material disposed over said pressure means and said parts, and a ram initially forcing the platen against said pressure means and causing said platen to flow therearound to engage and press against and actuate said parts.

2. Means for accurately sizing and shaping an elongate channel shaped piece having a center web and flanges joining the same at corners comprising a die having a cavity in which the piece is arranged, a flowable-material element engaged in the channel shaped piece, a punch assembly including members movable relative to the element for applying edgewise compression forces to the edges of the flanges, said assembly having an extensive upper surface, pressure means movable downwardly toward the cavity to press against said element and presenting an upper surface spaced above said punch assembly when said pressure means is in contact with said element, said surface of said pressure means being of less area than said upper surface of the punch assembly, a platen of flowable material, and a force applying means for forceably pressing the platen downwardly on said surface of the pressure means to thereby force said element against the internal surfaces of the piece to hold the web and flanges against the walls of the cavity, the platen then flowing around said surface of the pressure means onto said surface of said assembly to transmit force to said members and thus subject the material of the piece to edgewise compression while the web and flanges are restrained.

3. A means for accurately sizing and shaping an elongated channel-shaped piece having a center web and flanges joining the same at corners as defined in claim 2, wherein said members movable relative to said element comprise plates pivotally hinged on the surface of said die and having outermost loose ends positioned to be engageable with the edge portion of said flanges.

4. A means for accurately sizing and shaping an elongated channel-shaped piece having a center web and flanges joining the same at corners as defined in claim 2, wherein said members movable relative to said flowable-material element comprise plate members pivotally hinged on the surface of said die by one side thereof and having outermost loose ends positioned to be engageable with the edge portion of said flanges, said outermost loose ends having longitudinally spaced slots extending from the edges of said ends toward said side pivotally hinged on the surface of said die.

5. Means for accurately sizing and shaping an elongated channel-shaped piece having a center web and flanges joining the same at corners as defined in claim 2 wherein, said members of said punch assembly have lower edges for applying the compression forces which are stepped to have lower faces at the side nearest said element and upper faces at their outer sides, said lower faces and said upper faces being joined by an upwardly and outwardly sloping surface.

6. Means for accurately sizing and shaping an elongated channel-shaped piece having a center web and flanges joining the same at corners comprising a die having a cavity in which the piece is arranged, a flowable-material element engaged in the channel-shaped piece, a punch assembly for applying compressive forces to the edges of the flanges, said assembly comprising members engageable with the edges of said flanges and an upper member presenting an upper surface connecting said flange engageable members, said upper surface member being perpendicularly connected to said flange engageable members, said punch assembly being movable relative to said flowable material element, pressure means movable downwardly toward said die for pressing against said element, said pressure means presenting an upper surface spaced above said upper surface of said upper member of said punch assembly, a platen of flowable-material arranged to reciprocably engage said upper surfaces, a force applying means for forceably pressing said platen downwardly on said surface of said pressure means to thereby force said element against the internal surfaces of the piece to hold said web and flanges against the walls of said cavity, and for then causing the platen to flow around said upper surface of said pressure means to engage said upper surface of said upper member of said assembly to transmit force to said members and thus subject the flanges of the piece to edgewise compression while the web and flanges are restrained.

7. Means for accurately sizing and shaping an elongated channel-shaped piece having a center web and flanges joining the same at corners as defined in claim 6 wherein said upper surface of said upper member of said punch assembly constitutes a contiguous surface having apertures for parts of said pressure means to move within.

8. Means for accurately sizing and shaping a web piece having a flange angularly disposed relative to another part of the web piece comprising a die having a cavity to receive the piece to be shaped, a flowable-material element engaged in said web piece within said cavity, a platen of flowable material disposed over said cavity, a force applying means for forceably reciprocating said platen, a first force transmitting means reciprocably disposed between and operatively engagable with said platen and said flowable-material element, and having an upper-most surface providing for engagement with said platen, a second force transmitting means reciprocable relative to said first force transmitting means in a path substantially parallel to the direction of reciprocation of said first force transmitting means, said second means disposed between said platen and said piece and aligned to engage said flange of said piece upon reciprocation thereof and having an upper surface for contacting said platen, said upper-most surface of said first force transmitting means being spaced above said upper surface of said second force transmitting means when said first means is in contact with said element, said platen first engaging said upper-most surface of said first force transmitting means to thereby force said flowable-material element against the internal surfaces of said piece to hold said flange and said web part of the piece against the walls of the cavity, said platen then following around said upper-most surface of said first means onto said upper surface of said second force transmitting means to transmit force from said force applying means through said platen and said second force transmitting means to said flange of said piece to cause edgewise compression of said piece while said piece is restrained by said flowable-material element.

References Cited in the file of this patent

UNITED STATES PATENTS

| | | |
|---|---|---|
| 160,967 | Stetter | Mar. 16, 1875 |
| 616,764 | Bourke | Dec. 27, 1898 |
| 671,427 | Anderson | Apr. 9, 1901 |
| 1,152,983 | Sherbondy | Sept. 7, 1915 |
| 1,388,888 | Pomeon | Aug. 30, 1921 |
| 2,070,589 | Giacchino | Feb. 16, 1937 |
| 2,158,044 | Haller | May 9, 1939 |
| 2,244,043 | Baxter | June 3, 1941 |
| 2,368,717 | Marschner | Feb. 6, 1945 |
| 2,449,428 | Timmons | Sept. 14, 1948 |
| 2,639,495 | Voslamber | May 26, 1953 |
| 2,735,389 | Wurzburger | Feb. 21, 1956 |
| 2,827,007 | Wurzburger | Mar. 18, 1958 |

FOREIGN PATENTS

| | | |
|---|---|---|
| 124,894 | Germany | Nov. 18, 1901 |
| 363,533 | France | Aug. 6, 1906 |
| 640,463 | Great Britain | July 19, 1950 |